(12) United States Patent
Desai

(10) Patent No.: US 6,236,769 B1
(45) Date of Patent: May 22, 2001

(54) MACHINE VISION SYSTEMS AND METHODS FOR MORPHOLOGICAL TRANSFORMATION OF AN IMAGE WITH ZERO OR OTHER UNIFORM OFFSETS

(75) Inventor: Ranjit P. Desai, Framingham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/014,773

(22) Filed: Jan. 28, 1998

(51) Int. Cl.$^7$ .................................................. G06K 9/56
(52) U.S. Cl. .......................................... 382/308; 382/277
(58) Field of Search ................................... 382/308, 257, 382/274, 273, 205, 153, 256, 258, 259, 260, 261, 265

(56) References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |

(List continued on next page.)

FOREIGN PATENT DOCUMENTS

| | | |
|---|---|---|
| WO 95/122137 | 8/1995 | (WO) . |
| WO 95/21376 | 8/1995 | (WO) . |
| WO 97/21189 | 6/1997 | (WO) . |
| WO 97/22858 | 6/1997 | (WO) . |
| WO 97/24692 | 7/1997 | (WO) . |
| WO 97/24693 | 7/1997 | (WO) . |

OTHER PUBLICATIONS

"Image Processing For Scientific Applications," Bernd Jahne, 1997, pp. 331, 488–489, Jan. 1997.*

Chaital: Chakrabart: et al, "Novel Sorting Network–Based Architectures for Rank Order Filters", IEEE Transaction on VLSI Systems, vol. 2, No. 4, Dec. 1994.*

Denise M. Wilson et al "Rank–Order Filtering in Analog VLSI", Department of Electrical and Computer Engineering, Georgia Institute of Technology, Atlanta Georgia, 1996.*

(List continued on next page.)

Primary Examiner—Yon J. Couso
(74) Attorney, Agent, or Firm—David J. Powsner

(57) ABSTRACT

The invention provides machine vision systems for morphological transformation of a source image e.g., adapted for use with zero or uniform offsets. The systems have application, for example, in image erosion or dilation of images of varied image quality. Systems according to the invention compare each pixel in a first row (or line) of the image with a corresponding pixel in a second row of the image. In each comparison, the system identifies the pixel intensity of selected rank. Where the system effects a dilation-type transformation, for example, the comparison seeks a maximum of the compared pixels. For an erosion-type transformation, the comparison seeks a minimum. The pixel intensity value of selected rank (e.g., minimum or maximum) determined from each comparison is retained and, in turn, compared with the intensity values of the corresponding pixels in every other row in the image. These maximum/minimum values are, in turn, compared with the each other and, more particularly, with the values of selected rank (e.g., maximum or minimum) for the neighboring columns. The intensity value of selected rank from among each set of compared values is retained in the transformation image, e.g., in the row and column position corresponding to the center of neighborhood.

24 Claims, 4 Drawing Sheets

U.S. PATENT DOCUMENTS

| | | |
|---|---|---|
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,597,009 * | 6/1986 | Ballmer et al. ................... 358/93 |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,821,333 * | 4/1989 | Gillies ................................ 382/308 |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |
| 5,740,285 * | 4/1998 | Bloomberg et al. ................ 382/308 |
| 5,848,189 * | 12/1998 | Pearson et al. .................... 382/257 |
| 6,058,405 * | 5/2000 | Kolte et al. ....................... 708/304 |

OTHER PUBLICATIONS

Lucio F. C. Pessoa et al, "Morphological /Rank Neural Networks and Their Adaptive Optimal Design for Image Processing", School of Electrical and Computer Engineering, Georgia Institute of Technology, Atlanta, Georgia, 1996.*

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "PictureTel Live PCS 100(tm) Personal Visual Communications System," 3 pp. (1993).

PictureTel Corporation Product Brochure "PictureTel System 1000: Complete VideoConferenceing for Cost Sensitive Applications," 4 pp. (1993).

PictureTel Corporation Product Brochure, "PictureTel System 4000(tm) A Family of Models to Fit Your Application From Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

D. Gevorkian, J. Astola and S. Atourian, "Improving Gil–Werman Algorithm for Running Min and Max Filters", IEEE PAMI vol. 19, No. 5, May 1997, pp. 526–529.

Intel Corp, Architecture Manuals, Guidelines for Developing MMX Code, Chapter 3; pp. 3–1–3–26; http://developer.intel.com/mmx/manuals/dg/filename.htm.

Intel Corp, Architecture Manuals, MMX Code Development Strategy, Chapter 4; pp. 4–1–4–7; http://developer.intel.com/mmx/manuals/dg/filename.htm.

Intel Corp, Architecture Manuals, MMX Coding Techniques, Chapter 5; pp. 5–1–5–10; http://developer.intel.com/mmx/manuals/dg/filename.htm.

Intel Corp, Processor Optimizations, Optimization Techniques for Integer Blended Code, Chapter 3, pp. 3–1–3–36; http://developer.intel.com/drg/productname/appnotes/filename.

J. Gil and M. Werman, "Computing 2–D Min, Median and Max Filters", IEEE PAMI, vol. 15, No. 5, pp. 504–507, May 1993.

* cited by examiner

MACHINE VISION SYSTEMS AND METHODS FOR MORPHOLOGICAL TRANSFORMATION OF AN IMAGE WITH ZERO OR OTHER UNIFORM OFFSETS

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to the morphological transformation of images, e.g., via dilation and erosion, with zero or other uniform offsets.

The human mind is uncannily adept at identifying patterns in images. It readily distinguishes between foreground and background, as well as among objects in either. Thus, even those young of years or lacking in mental capacity are capable of distinguishing the outreached hand from the scowling face.

What comes to the mind so easily can be painstakingly difficult to teach a computer. Machine vision is one example. Software engineers have long labored to program these machines to identify objects in digital images. Though their efforts have paid off, the going has been slow. It is fair to estimate that billions of lines of code have been thrown out in the effort.

The early machine vision programs used special purpose algorithms to solve each new programming challenge. This practice was abandoned as modular programming came to the fore. Software engineering, in general, and machine vision, in particular, benefited from the new technique. Libraries were developed containing hundreds of small, "reusable" algorithms that could be invoked on a mix-and-match basis. Relying on these, software engineers were able to construct shorter, more reliable and more easily debugged programs for the image inspection tasks at hand.

Common to these libraries are the so-called dilation and erosion software "tools." These are used to emphasize or de-emphasize patterns in digital images and, thereby, to facilitate the recognition of objects in them. They are generally applied during image preprocessing, that is, prior to pattern recognition. As a result, they are referred to as morphological (or shape-based) transformation tools.

As its name implies, the dilation tool is used to enlarge features in an image. Roughly speaking, it does this by replacing each pixel (or point) in the image with its brightest neighbor. For example, if a given pixel has an intensity of 50 and one of its nearby neighbors has an intensity of 60, the value of the latter is substituted for the former. Application of this tool typically enlarges and emphasizes foreground surfaces, edges and other bright features.

The erosion tool does just the opposite. It de-emphasizes bright features by eroding their borders. Rather than replacing each pixel with its brightest neighbor, this tool replaces each with its dimmest, or least intense, neighbor. This can have the effect of diminishing bright foreground features, though, it is typically used to eliminate small imaging artifacts, such as those resulting from reflections, scratches or dust.

Prior art dilation and erosion tools are legion. A problem with many such tools, however, is that they cannot be readily adapted to compensate for a wide range of image-capture environments. One particular problem in this regard is poor illumination, which can result in an image so light or dark as to make pattern recognition difficult.

Although fast, accurate and flexible morphological vision tools are marketed by Cognex Corporation, the assignee hereof, there remains a need for still better such tools. Accordingly, an object of this invention is to provide improved machine vision systems and methods for morphological transformations that can compensate for varied image quality, e.g., by use of zero offsets, or other uniform offsets.

A still further object of the invention is to provide such systems and methods as provide for image dilation and erosion-using zero offsets or other uniform offsets.

A further object of the invention is to provide such systems as operate accurately and rapidly, yet, without requiring unduly expensive processing equipment or without undue consumption of resources.

A related object of the invention is to provide such systems as can be implemented on conventional digital data processors or other conventional machine vision analysis equipment, without excessive cost or difficulty.

SUMMARY OF THE INVENTION

The foregoing are among the objects attained by the invention, which provides machine vision systems and methods for morphological transformation of source images adapted for use, e.g., with zero or other uniform offsets. Such methods have application, for example, in inspection applications where illumination is poor, e.g., too low or too bright.

The method of one aspect of the invention contemplates comparing each pixel in a first row (or line) of a source image with a corresponding pixel in a second row of the image. Thus, for example, the first pixel in row 1 of the image is compared with the first pixel in row 2; the second pixel in row 1 with the second pixel in row 2; and so forth. The comparisons, which can be carried out individually or en masse (e.g., using register-level instructions of a superscalar processor), identify the pixel intensity of a selected rank as between each pair of compared pixels.

Where the method effects a dilation transformation, for example, the comparison seeks a maximum of each pair of compared pixels. For an erosion transformation, the comparison seeks a minimum. Other transformations may require averages or other functions of the compared pixel intensities.

The pixel intensity value of selected rank (e.g., minimum or maximum) determined from each comparison is retained and, in turn, compared with the intensity values of the corresponding pixels in the adjacent rows of the image. The number of compared rows depends on the size of the "neighborhoods" or regions on which the transformation is based. For example, three rows are compared for neighborhoods of size 3×3, five rows, for 5×5, and so forth. In this way, the method determines the pixel intensity value of selected rank for the columns in the "neighborhood" of each pixel.

These "column winners" are, in turn, compared with the each other and, more particularly, with the winners of the neighboring columns. The pixel intensity value of selected rank from among each set of compared values, i.e., the "neighborhood winner," is retained in the transformation image—typically in the row and column position corresponding to the center of neighborhood in the original image.

Take, for example, a 5×3 region of a source image whose pixel intensities are as follows:

| 11 | 2  | 3  | 4  | 15 |
|----|----|----|----|----|
| 6  | 12 | 8  | 14 | 10 |
| 1  | 7  | 13 | 9  | 5  |

The column winners for a dilation operation determined in accord with the foregoing method are as follows:

11 12 13 14 15

The 5×3 region comprises three overlapping 3×3 neighborhoods, i.e., the neighborhood comprising the pixels of intensities 2, 3, 6, 12, 8, 1, 7, 13; 2, 3, 4, 12, 8, 14, 7, 13, 9; and 3, 4, 15, 8, 14, 10, 13, 9, 5. The neighborhood winners for these respective neighborhoods are:

13 14 15

Those neighborhood winners effectively constitute the pixel of selected rank (in this case, maximum) from each respective neighborhood. They are stored in the transformation image at locations corresponding to the centers of the respective neighborhoods, i.e., at locations corresponding to the original pixels of intensity 12, 8 and 14, respectively.

The number of neighboring columns with which each column winner is compared depends on the neighborhood size. For example, where the transformation is based on 3×3 neighborhoods, each column winner is compared with the winner for one column on each side; for 5×5 neighborhoods, with the winners for two columns on either side; and so forth.

Further aspects of the invention provide methods as described above wherein several data stores, e.g., processor registers, are used to store image rows under comparison. Thus, for example, in order to compare the first and second rows of an image, the method loads respective columns (i.e., pixels) of the first row into a first data store and those of the second row into a second data store. Upon comparing the respective columns in those stores, the method stores the pixel intensity value of selected rank (e.g., minimum or maximum) back into the first store, e.g., via a third or other holding store.

The method can then proceed by loading each successive row of the corresponding neighborhoods into the second store, re-comparing the columns of the first and second stores, and re-storing the results of those comparisons into the first store. Once the column winners have been determined, the neighborhood winners can be determined, e.g., by copying the contents of the first store to the second store, left- or right-shifting it by one or more columns, and recomparing the first and second stores. To these neighborhood winners can be added uniform offsets, e.g., in order to uniformly bias the source image.

The method can be extended, moreover, to process multiple bands simultaneously. For example, one aspect of the invention provides for transformation of two bands of 3×3 neighborhoods by determining the neighborhood winners for second, third and fourth rows of an image with a first set of processor registers, while synchronously and concurrently determining neighborhood winners of third, fourth, and fifth rows of that same image with a second set of registers. The remainder of a six-row strip of the image can be transformed by subsequently determining the neighborhood winners for first, second, and third rows using the first register set, while simultaneously determining neighborhood winners for the fourth, fifth and sixth rows using the second register set.

Still other aspects of the invention provide digital data processing systems operating in accord with the foregoing methods, as well as media for storage of programs for causing a digital data processing system to execute such methods.

These and other aspects of the invention are evident in the drawings and in the description that follows.

Systems and methods provided by the invention utilize processor resources in such a manner as to take advantage, e.g., of SIMD (Single Instruction Multiple Data) pipelined architecture characteristics. These systems and methods require only a limited number of registersrequire only a limited number of registers in order to generate morphological transformations. As a result, they permit higher pixel throughput and, consequently, speed processing of images. They also allow processing of larger images. Moreover, the systems and methods organize data flow in a manner that minimizes memory access penalties, specifically, through better utilization of data residing in cache. This minimizes memory faults and, therefore, speeds image processing.

The invention has wide application in industry and research applications. The dilation and erosions transformations provided thereby can be cascaded to produce still more complex morphological transformations, such as "opening" (e.g., erosion followed by dilation) and "closing" (e.g., dilation followed by erosion). It facilitates automated analysis of images by providing rapid and low-cost methods and apparatus for image transformation. Thus, for example, a manufacturing line equipped with a machine vision system operating in accord with the invention can readily generate dilated and eroded images to speed analysis of images during assembly and, thereby, more efficiently control component placement.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
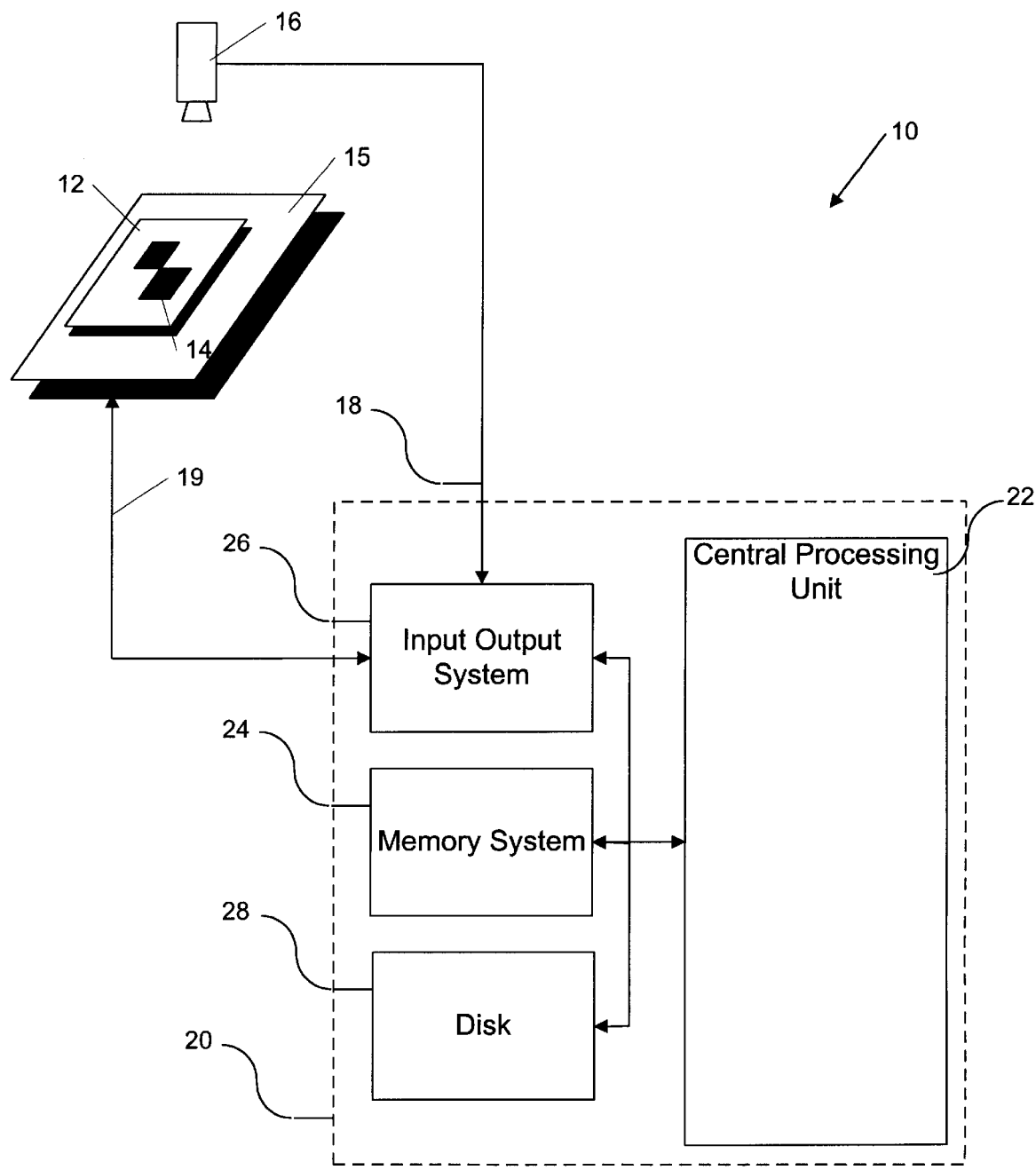
FIG. 1 depicts a digital data processing system according to the invention for generating a morphological transformation of an image.

FIG. 1 depicts a machine vision system 10 according to the invention for morphological transformation of images. The system 10 includes an image capture device, e.g., camera 16, that generates an image of a scene including object 12. Digital image data (or pixels) generated by the capturing device 16 represent, in the conventional manner, the image intensity (e.g., contrast, color, brightness) of each point in the field of view of the capturing device. The image acquisition device may be video camera, charge coupled display (CCD) device, or any other device suitable for imaging device at least a target 14 disposed on object 12. In the illustration, the object 12 is disposed on a platform 15 capable of translating and rotating the object, e.g., based on information determined by image analysis system 20 in connection with the morphological transformations described herein.

Digital image data is transmitted from capturing device 16 via a communications path 18 to the image analysis system 20. This can be a conventional digital data processor, or a vision processing system of the type commercially available from the assignee hereof, Cognex Corporation, as programmed in accord with the teachings hereof to dilate, erode or otherwise morphologically transpose an image acquired by device 16. The image analysis system 20 may have one or more central processing units 22, main memory 24, input-output system 26, and disk drive (or other mass storage device) 28, all of the conventional type. A preferred central processing unit for use in carrying out methods according to the invention has a superscalar instruction set, e.g., the Intel MMX Processors.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2:
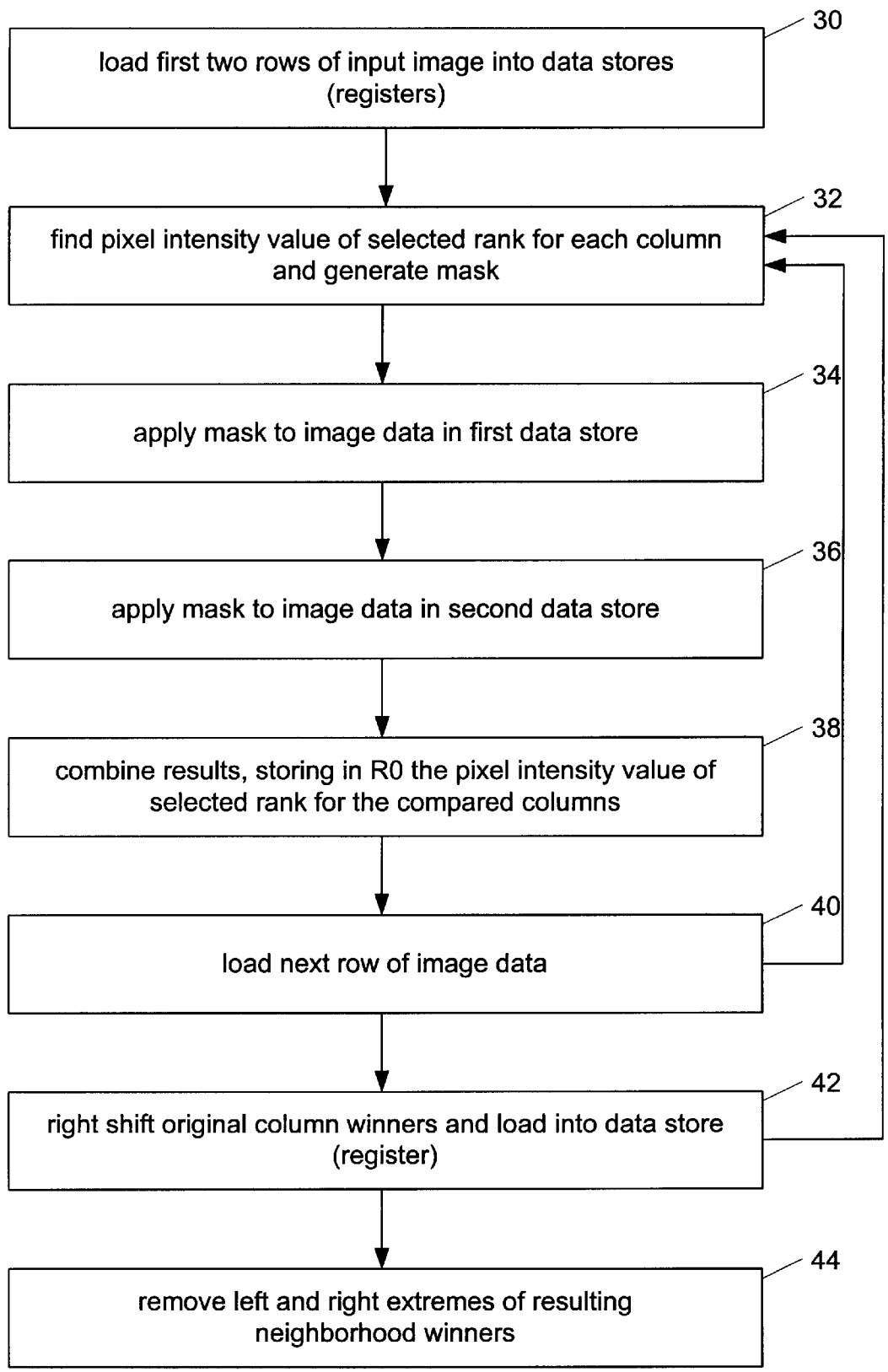
FIG. 2 depicts a method according to the invention for transforming a band of a source image comprising a single line of successive neighborhoods.

FIG. 2 illustrates a method according to the invention for generating a morphological transformation, and, particularly, a dilation image, from an image acquired by capturing device 16 or an image otherwise present on image analysis system 20. A small band of such an image is illustrated below, with each number representing a pixel intensity, e.g., a contrast, color or brightness of a corresponding point in the image. The illustrated band comprises the pixels defining several successive 3×3 neighborhoods in the image. Those skilled in the art will appreciate that, though typical, such a neighborhood size is not necessitated by the invention, which contemplates the use of rectangular and square neighborhoods of other sizes as well:

|  |  |
|---|---|
| 1 1 1 9 1 1 1 1 | |
| 2 2 2 2 2 9 2 2 | Source Image |
| 3 3 3 3 3 3 3 3 | |

In step 30, the illustrated method loads, a portion of the source image into data stores, e.g., processor registers, in order to begin the transformation. Specifically, in the illustrated embodiment, the method loads as many "columns," or pixels, of the first and second rows of the image as will fit into the data stores, or registers, as shown in the table entitled "Load Registers," below. In that table, and the others that follow, registers are labeled "R x" where x is the register number. Thus, it is seen that the first row is loaded into R0 and R2, while the second row is loaded into R1.

In step 32, the illustrated method compares the loaded rows, column by column, to identify for each pair of columns the pixel intensity of selected rank, e.g., largest pixel or smallest pixel. The illustrated method performs a dilation transformation, hence, the selected rank is maximum or largest. Other embodiments, e.g., for erosion transformations, may use a minimum or smallest rank. Still other embodiments may use other functions of the compared values. The comparisons may be performed individually or en masse, e.g., using the processor functions of a superscalar processor. Based on this comparison, the method generates and stores in R0 a mask, e.g., as shown in the table entitled "Generate Mask." In the illustrated embodiment, this mask has a value of 1 for each column for which the maximum pixel intensity is in R2.

|  | Load Regs. | Generate Mask |
|---|---|---|
| R 0 | 1 1 1 9 1 1 1 1 | 0 0 0 1 0 0 0 0 |
| R 1 | 2 2 2 2 2 9 2 2 | 2 2 2 2 2 9 2 2 |
| R 2 | 1 1 1 9 1 1 1 1 | 1 1 1 9 1 1 1 1 |

In steps 34 and 36, the illustrated method applies the mask (stored in R0) to the row data stored in R1 and R2. Based on that comparison, it zeros those intensity values which are not of the selected rank (e.g., which are not the largest) as between the previously compared columns. This is illustrated in the tables below entitled "Apply Mask to R1" and "Apply Mast to R2

|  | Apply Mask to R 2 | Apply Mask to R 1 |
|---|---|---|
| R 0 | 0 0 0 1 0 0 0 0 | 0 0 0 1 0 0 0 0 |
| R 1 | 2 2 2 2 2 9 2 2 | 2 2 2 0 2 9 2 2 |
| R 2 | 0 0 0 9 0 0 0 0 | 0 0 0 9 0 0 0 0 |

In step 38, the illustrated method combines the pixel data in data stores R1 and R2, specifically, filling R0 with the maximum pixel intensity values of each respective row. This is illustrated in the table below entitled "Combine."

|  | Combine |
|---|---|
| R 0 | 2 2 2 9 2 9 2 2 |
| R 1 | 2 2 2 0 2 9 2 2 |
| R 2 | 0 0 0 9 0 0 0 0 |

As illustrated below, the foregoing steps are repeated in order to compare the result determined in step 38, above, with the pixel intensity values in the third row of the image. More particularly, in step 40, the third row of image data is loaded into R1. Steps 32–38 are then repeated as above. This process is repeated for each row in the current band of the image.

As illustrated in the table below entitled "Combine," these operations result in storage, in R0, of the "column winners" for the compared rows, i.e., the maximum pixel intensity values for each column of the compared portions of rows 1–3 of the image.

|  | Load Regs. | Generate Mask |  |
|---|---|---|---|
| R 0 | 2 2 2 9 2 9 2 2 | 0 0 0 1 0 1 0 0 | |
| R 1 | 3 3 3 3 3 3 3 3 | 3 3 3 3 3 3 3 3 | |
| R 2 | 2 2 2 9 2 9 2 2 | 2 2 2 9 2 9 2 2 | |

|  | Apply Mask to R 2 | Apply Mask to R 1 | Combine |
|---|---|---|---|
| R 0 | 0 0 0 1 0 1 0 0 | 0 0 0 1 0 1 0 0 | 3 3 3 9 3 9 3 3 |
| R 1 | 3 3 3 3 3 3 3 3 | 3 3 3 0 3 0 3 3 | 3 3 3 0 3 0 3 3 |
| R 2 | 0 0 0 9 0 9 0 0 | 0 0 0 9 0 9 0 0 | 0 0 0 9 0 9 0 0 |

Once the column winners have been determined, the method identifies the "neighborhood winners," e.g., the maximum intensity value pixel in each 3×3 neighborhood in the image. For this purpose, the method essentially repeats steps 32–38 in order to compare the original column winners (stored in R0) with right-shifted and 2×right-shifted transformations thereof Those skilled in the art will, of course, appreciate that the invention is not limited to 3×3 neighborhoods but, rather, will work of neighborhoods of any size and variety of configurations, e.g., rectangular.

To prepare for finding the neighborhood winners, the method copies the original column winners to a temporary data store, R3. It then copies the contents of R3 into R1 and right-shifts them by one column, as indicated by step 42. Steps 32–38 are then repeated as above

|    | Load Regs. | Generate Mask |          |
|----|------------|---------------|----------|
| R 0 | 3 3 3 9 3 9 3 3 | 1 0 0 1 0 1 0 0 |        |
| R 1 | 0 3 3 3 9 3 9 3 | 0 3 3 3 9 3 9 3 |        |
| R 2 | 3 3 3 9 3 9 3 3 | 3 3 3 9 3 9 3 3 |        |
| R 3 | 3 3 3 9 3 9 3 3 | 3 3 3 9 3 9 3 3 |        |
|    | Apply Mask to R 2 | Apply Mask to R 1 | Combine |
| R 0 | 1 0 0 1 0 1 0 0 | 1 0 0 1 0 1 0 0 | 3 3 3 9 9 9 9 3 |
| R 1 | 0 3 3 3 9 3 9 3 | 0 3 3 0 9 0 9 3 | 0 3 3 0 9 0 9 3 |
| R 2 | 3 0 0 9 0 9 0 0 | 3 0 0 9 0 9 0 0 | 3 0 0 9 0 9 0 0 |
| R 3 | 3 3 3 9 3 9 3 3 | 3 3 3 9 3 9 3 3 | 3 3 3 9 3 9 3 3 |

To continue determination of the neighborhood winners, step 42 is repeated. This time, the contents of R3, i.e., the original column winners, are right-shifted by two columns after being copied into R1. Steps 32–38 are again repeated.

|    | Load Regs. | Generate Mask |          |
|----|------------|---------------|----------|
| R 0 | 3 3 3 9 9 9 9 3 | 1 1 0 1 1 0 1 0 |        |
| R 1 | 0 0 3 3 3 9 3 9 | 0 0 3 3 3 9 3 9 |        |
| R 2 | 3 3 3 9 9 9 9 3 | 3 3 3 9 9 9 9 3 |        |
| R 3 | 3 3 3 9 3 9 3 3 | 3 3 3 9 3 9 3 3 |        |
|    | Apply Mask to R 2 | Apply Mask to R 1 | Combine |
| R 0 | 1 1 0 1 1 0 1 0 | 1 1 0 1 1 0 1 0 | 3 3 3 9 9 9 9 9 |
| R 1 | 0 0 3 3 3 9 3 9 | 0 0 3 0 0 9 0 9 | 0 0 3 0 0 9 0 9 |
| R 2 | 3 3 0 9 9 0 9 0 | 3 3 0 9 9 0 9 0 | 3 3 0 9 9 0 9 0 |
| R 3 | 3 3 3 9 3 9 3 3 | 3 3 3 9 3 9 3 3 | 3 3 3 9 3 9 3 3 |

As a result of the foregoing operations, the neighborhood winners of the compared rows are contained in data store R0. The values in the left-most and right-most columns of that store, however, cannot be relied upon since they lie at the edges of the band and, hence, are not based on complete neighborhoods of pixels. To remove them, the register is left-shifted and, then, right-shifted, as illustrated below.

|    | left shift R 0 | right shift R 0 |
|----|----------------|-----------------|
| R 0 | 3 9 9 9 9 9 0 0 | 0 3 9 9 9 9 9 0 |
| R 1 | 0 0 3 0 0 9 0 9 | 0 0 3 0 0 9 0 9 |
| R 2 | 3 3 0 9 9 0 9 0 | 3 3 0 9 9 0 9 0 |
| R 3 | 3 3 3 9 3 9 3 3 | 3 3 3 9 3 9 3 3 |

In embodiments of the invention that provide for the addition of a non-zero, uniform offset to the intensity values of the pixel in the Source Image, that offset is preferably added to the neighborhood winners just prior to the left- and right-shifting step. Those skilled in the art will, of course, appreciate that such an offset can be added during other phases of the process, as well.

Finally, in step 46, the values of the neighborhood winners are stored to a transformation image—in this case, a dilation image—at locations corresponding to the centers of the respective neighborhoods, as illustrated below:

```
1 1 1 9 1 1 1 1
2 2 2 2 2 9 2 2                3 9 9 9 9 0
3 3 3 3 3 3 3 3
Source Image              Transformation Image
```

The method of FIG. 2 can be readily applied to transform multiple rows of an image. Thus, for example, in the discussion that follows, it is used to concurrently used to determine neighborhood winners of rows 2, 3, 4 and 3, 4, 5 of the following Source Image. It is then used to concurrently determine the neighborhood winners of rows 1, 2, 3 and 4, 5, 6 of the image.

```
1 1 1 9 1 1 1 1 1 1 1 1 9 1 1 1 1 1
2 2 2 2 2 9 2 2 2 2 2 2 2 2 9 2 2 2
3 3 3 3 3 3 3 3 3 3 3 3 3 3 3 3 3 3
4 4 4 9 4 4 4 4 4 4 4 4 9 4 4 4 4 4
5 5 5 5 5 9 5 5 5 5 5 5 5 5 9 5 5 5      Source Image
6 9 6 6 9 6 6 6 6 6 6 6 9 6 6 9 6 6 6
7 7 9 7 7 7 9 7 7 7 7 7 9 7 7 7 9 7
9 8 8 8 8 8 9 8 8 9 8 8 8 8 8 8 9
9 9 9 9 9 9 9 9 9 9 9 9 9 9 9 9 9 9
```

In addition to requiring relatively few data stores, e.g., registers, in order to perform these concurrent transformations, an advantage of such application of the method is that it is highly efficient in its usage of memory. For example, as evident below, in order to perform the illustrated transformation, these operations require only seven processor registers and the one-time loading of an 8×8 buffer or cache, as shown below

```
1 1 1 9 1 1 1 1
2 2 2 2 2 9 2 2
3 3 3 3 3 3 3 3         Cache
4 4 4 9 4 4 4 4
5 5 5 5 5 9 5 5
6 9 6 6 9 6 6 6
7 7 9 7 7 7 9 7
9 8 8 8 8 8 8 9
```

Figure 3:
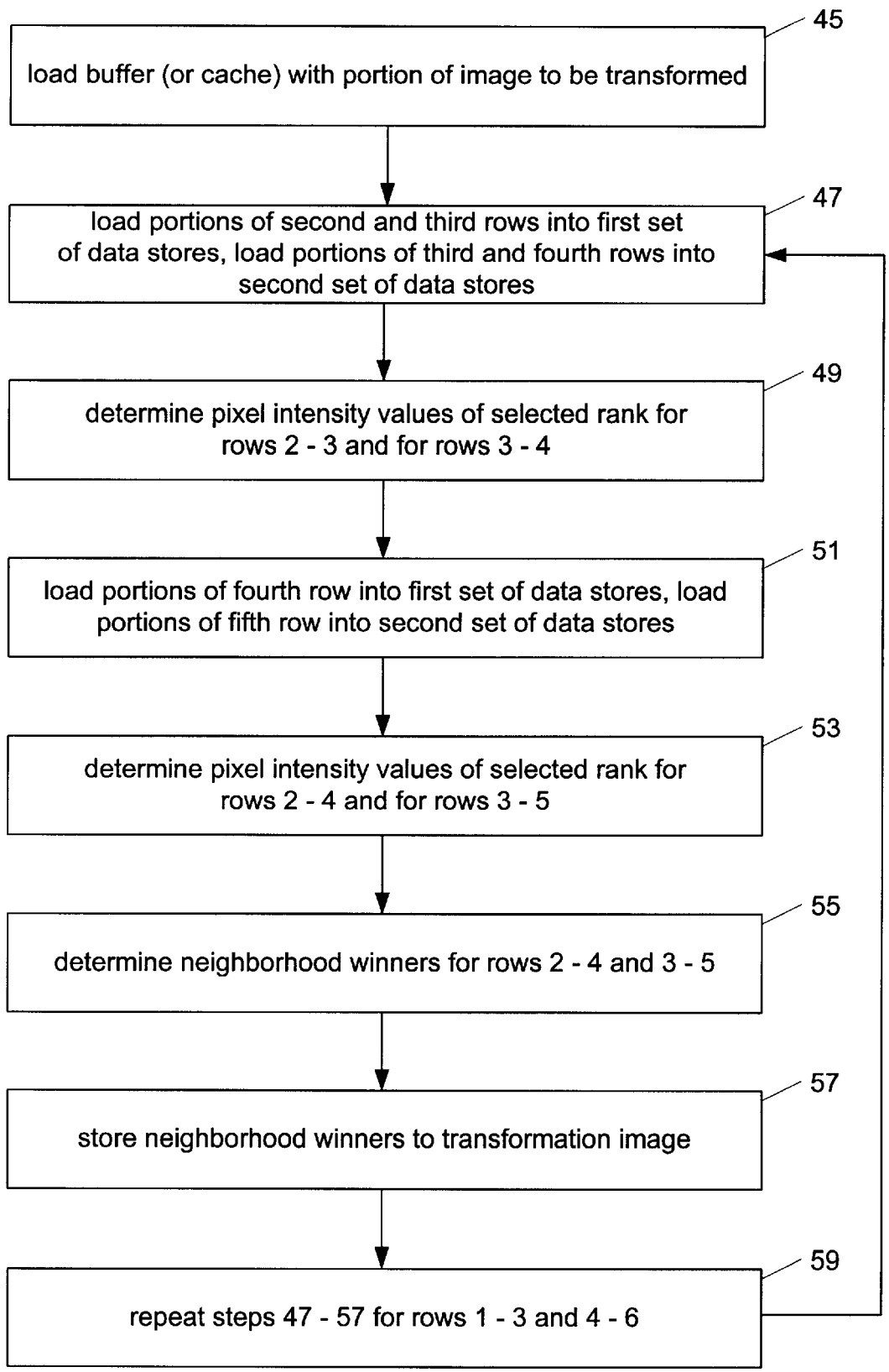
FIG. 3 depicts a method according to the invention for transforming multiple bands of a source image.

Referring to FIG. 3, there is illustrated a methodology according to the invention for transformation of multiple rows of a Source Image. In step 45, the method loads a buffer, cache or other data store of the type shown above with a portion of the image to be transformed.

In step 47, the method loads portions of the second and third rows of the image into R2 and R1, respectively, while also loading the portion of the second row into R0. At the same time, the method loads portions of the third and fourth rows of into R6 and R5, respectively, while also loading the portion of the third row into R4. The effect of these operations is shown in the table below entitled "Load Regs." The method then proceeds as discussed above in order to determine the pixel intensity values of selected rank from among the columns of the R2 and R1, and R6 and R5, respectively, as shown below:

|    | Load Regs. | Generate Mask |
|----|------------|---------------|
| R0 | 2 2 2 2 2 9 2 2 | 0 0 0 0 0 1 0 0 |
| R1 | 3 3 3 3 3 3 3 3 | 3 3 3 3 3 3 3 3 |
| R2 | 2 2 2 2 2 9 2 2 | 2 2 2 2 2 9 2 2 |
| R3 |   |   |
| R4 | 3 3 3 3 3 3 3 3 | 0 0 0 0 0 0 0 0 |
| R5 | 4 4 4 9 4 4 4 4 | 4 4 4 9 4 4 4 4 |
| R6 | 3 3 3 3 3 3 3 3 | 3 3 3 3 3 3 3 3 |
| R7 |   |   |

|    | Apply Mask to R2 | Apply Mask to R1 | Combine |
|----|------------------|------------------|---------|
| R0 | 0 0 0 0 0 1 0 0 | 0 0 0 0 0 1 0 0 | 3 3 3 3 3 9 3 3 |
| R1 | 3 3 3 3 3 3 3 3 | 3 3 3 3 3 0 3 3 | 3 3 3 3 3 0 3 3 |
| R2 | 0 0 0 0 0 9 0 0 | 0 0 0 0 0 9 0 0 | 0 0 0 0 0 9 0 0 |
| R3 |   |   |   |
| R4 | 0 0 0 0 0 0 0 0 | 0 0 0 0 0 0 0 0 | 4 4 4 9 4 4 4 4 |
| R5 | 4 4 4 9 4 4 4 4 | 4 4 4 9 4 4 4 4 | 4 4 4 9 4 4 4 4 |
| R6 | 0 0 0 0 0 0 0 0 | 0 0 0 0 0 0 0 0 | 0 0 0 0 0 0 0 0 |
| R7 |   |   |   |

In step 51, the method loads portions of the fourth row into R2 for comparison with the values selected from the comparison of second and third rows, above. At the same time, the method loads portions of the fifth row of into R6 for comparison with the values selected from comparison of the third and fourth rows. In step 53, the method then proceeds as discussed above in order to determine the pixel intensity values of selected rank from among the columns of the R2 and R1, and R6 and R5, respectively, as shown below. These values are, effectively, the column winners for the respective 3×3 neighborhoods of the 2–4 and 2–5 rows.

|    | Load Regs. | Generate Mask |
|----|------------|---------------|
| R0 | 3 3 3 3 3 9 3 3 | 0 0 0 0 0 1 0 0 |
| R1 | 4 4 4 9 4 4 4 4 | 4 4 4 9 4 4 4 4 |
| R2 | 3 3 3 3 3 9 3 3 | 3 3 3 3 3 9 3 3 |
| R3 |   |   |
| R4 | 4 4 4 9 4 4 4 4 | 0 0 0 1 0 0 0 0 |
| R5 | 5 5 5 5 5 9 5 5 | 5 5 5 5 5 9 5 5 |
| R6 | 4 4 4 9 4 4 4 4 | 4 4 4 9 4 4 4 4 |
| R7 |   |   |

In step 55, the method determines the neighborhood winners for the respective neighborhoods of rows 2–4 and 3–5. This is done by right-shifting and doubly right-shifting the original column winners in the manner described above in connection with step 42, and as shown below:

|    | Apply Mask to R2 | Apply Mask to R1 | Combine |
|----|------------------|------------------|---------|
| R0 | 0 0 0 0 0 1 0 0 | 0 0 0 0 0 1 0 0 | 4 4 4 9 4 9 4 4 |
| R1 | 4 4 4 9 4 4 4 4 | 4 4 4 9 4 0 4 4 | 4 4 4 9 4 0 4 4 |
| R2 | 0 0 0 0 0 9 0 0 | 0 0 0 0 0 9 0 0 | 0 0 0 0 0 9 0 0 |
| R3 |   |   |   |
| R4 | 0 0 0 1 0 0 0 0 | 0 0 0 1 0 0 0 0 | 5 5 5 9 5 9 5 5 |
| R5 | 5 5 5 5 5 9 5 5 | 5 5 5 0 5 9 5 5 | 5 5 5 0 5 9 5 5 |
| R6 | 0 0 0 9 0 0 0 0 | 0 0 0 9 0 0 0 0 | 0 0 0 9 0 0 0 0 |
| R7 |   |   |   |

|    | Load Regs. | Generate Mask |
|----|------------|---------------|
| R0 | 4 4 4 9 4 9 4 4 | 1 0 0 1 0 1 0 0 |
| R1 | 0 4 4 4 9 4 9 4 | 0 4 4 4 9 4 9 4 |
| R2 | 4 4 4 9 4 9 4 4 | 4 4 4 9 4 9 4 4 |
| R3 | 4 4 4 9 4 9 4 4 | 4 4 4 9 4 9 4 4 |
| R4 | 5 5 5 9 5 9 5 5 | 1 0 0 1 0 1 0 0 |
| R5 | 0 5 5 5 9 5 9 5 | 0 5 5 5 9 5 9 5 |
| R6 | 5 5 5 9 5 9 5 5 | 5 5 5 9 5 9 5 5 |
| R7 | 5 5 5 9 5 9 5 5 | 5 5 5 9 5 9 5 5 |

|    | Apply Mask to R2 | Apply Mask to R1 | Combine |
|----|------------------|------------------|---------|
| R0 | 1 0 0 1 0 1 0 0 | 1 0 0 1 0 1 0 0 | 4 4 4 9 9 9 9 4 |
| R1 | 0 4 4 4 9 4 9 4 | 0 4 4 0 9 0 9 4 | 0 4 4 0 9 0 9 4 |
| R2 | 4 0 0 9 0 9 0 0 | 4 0 0 9 0 9 0 0 | 4 0 0 9 0 9 0 0 |
| R3 | 4 4 4 9 4 9 4 4 | 4 4 4 9 4 9 4 4 | 4 4 4 9 4 9 4 4 |
| R4 | 1 0 0 1 0 1 0 0 | 1 0 0 1 0 1 0 0 | 5 5 5 9 9 9 9 5 |
| R5 | 0 5 5 5 9 5 9 5 | 0 5 5 0 9 0 9 5 | 0 5 5 0 9 0 9 5 |
| R6 | 5 0 0 9 0 9 0 0 | 5 0 0 9 0 9 0 0 | 5 0 0 9 0 9 0 0 |
| R7 | 5 5 5 9 5 9 5 5 | 5 5 5 9 5 9 5 5 | 5 5 5 9 5 9 5 5 |

|    | Load Regs. | Generate Mask |
|----|------------|---------------|
| R0 | 4 4 4 9 9 9 9 4 | 1 1 0 1 1 0 1 0 |
| R1 | 0 0 4 4 4 9 4 9 | 0 0 4 4 4 9 4 9 |
| R2 | 4 4 4 9 9 9 9 4 | 4 4 4 9 9 9 9 4 |
| R3 | 4 4 4 9 4 9 4 4 | 4 4 4 9 4 9 4 4 |
| R4 | 5 5 5 9 9 9 9 5 | 1 1 0 1 1 0 1 0 |
| R5 | 0 0 5 5 5 9 5 9 | 0 0 5 5 5 9 5 9 |
| R6 | 5 5 5 9 9 9 9 5 | 5 5 5 9 9 9 9 5 |
| R7 | 5 5 5 9 5 9 5 5 | 5 5 5 9 5 9 5 5 |

|    | Apply Mask to R2 | Apply Mask to R1 | Combine |
|----|------------------|------------------|---------|
| R0 | 1 1 0 1 1 0 1 0 | 1 1 0 1 1 0 1 0 | 4 4 4 9 9 9 9 9 |
| R1 | 0 0 4 4 4 9 4 9 | 0 0 4 0 0 9 0 9 | 0 0 4 0 0 9 0 9 |
| R2 | 4 4 0 9 9 0 9 0 | 4 4 0 9 9 0 9 0 | 4 4 0 9 9 0 9 0 |
| R3 | 4 4 4 9 4 9 4 4 | 4 4 4 9 4 9 4 4 | 4 4 4 9 4 9 4 4 |
| R4 | 1 1 0 1 1 0 1 0 | 1 1 0 1 1 0 1 0 | 5 5 5 9 9 9 9 9 |
| R5 | 0 0 5 5 5 9 5 9 | 0 0 5 0 0 9 0 9 | 0 0 5 0 0 9 0 9 |
| R6 | 5 5 0 9 9 0 9 0 | 5 5 0 9 9 0 9 0 | 5 5 0 9 9 0 9 0 |
| R7 | 5 5 5 9 5 9 5 5 | 5 5 5 9 5 9 5 5 | 5 5 5 9 5 9 5 5 |

The results are left- and right-shifted as discussed above to remove the values at the edges, as shown below. As discussed above, uniform offsets, if any, are preferably added to the neighborhood winners prior to this step.

|    | left shift R0 | right shift R0 |
|----|---------------|----------------|
| R0 | 4 9 9 9 9 9 0 0 | 0 4 9 9 9 9 9 0 |
| R1 | 0 0 4 0 0 9 0 9 | 0 0 4 0 0 9 0 9 |
| R2 | 4 4 0 9 9 0 9 0 | 4 4 0 9 9 0 9 0 |
| R3 | 4 4 4 9 4 9 4 4 | 4 4 4 9 4 9 4 4 |
| R4 | 5 9 9 9 9 9 0 0 | 0 5 9 9 9 9 9 0 |
| R5 | 0 0 5 0 0 9 0 9 | 0 0 5 0 0 9 0 9 |
| R6 | 5 5 0 9 9 0 9 0 | 5 5 0 9 9 0 9 0 |
| R7 | 5 5 5 9 5 9 5 5 | 5 5 5 9 5 9 5 5 |

In step 57, the neighborhood winners are stored to the transformation image at locations corresponding to the centers of the respective neighborhoods, as shown below:

```
0 4 9 9 9 9 9 0
0 5 9 9 9 9 9 0
Transformation Image
```

As indicated by step 59, the foregoing steps are repeated for rows 1–3 and 4–6, as shown below:

| | Load Regs. | Generate Mask | |
|---|---|---|---|
| R0 | 1 1 1 9 1 1 1 1 | 0 0 0 1 0 0 0 0 | |
| R1 | 2 2 2 2 2 9 2 2 | 2 2 2 2 2 9 2 2 | |
| R2 | 1 1 1 9 1 1 1 1 | 1 1 1 9 1 1 1 1 | |
| R3 | | | |
| R4 | 4 4 4 9 4 4 4 4 | 0 0 0 1 0 0 0 0 | |
| R5 | 5 5 5 5 5 9 5 5 | 5 5 5 5 5 9 5 5 | |
| R6 | 4 4 4 9 4 4 4 4 | 4 4 4 9 4 4 4 4 | |
| R7 | | | |

| | Apply Mask to R2 | Apply Mask to R1 | Combine |
|---|---|---|---|
| R0 | 0 0 0 1 0 0 0 0 | 0 0 0 1 0 0 0 0 | 2 2 2 9 2 9 2 2 |
| R1 | 2 2 2 2 2 9 2 2 | 2 2 2 0 2 9 2 2 | 2 2 2 0 2 9 2 2 |
| R2 | 0 0 0 9 0 0 0 0 | 0 0 0 9 0 0 0 0 | 0 0 0 9 0 0 0 0 |
| R3 | | | |
| R4 | 0 0 0 1 0 0 0 0 | 0 0 0 1 0 0 0 0 | 5 5 5 9 5 9 5 5 |
| R5 | 5 5 5 5 5 9 5 5 | 5 5 5 0 5 9 5 5 | 5 5 5 0 5 9 5 5 |
| R6 | 0 0 0 9 0 0 0 0 | 0 0 0 9 0 0 0 0 | 0 0 0 9 0 0 0 0 |
| R7 | | | |

| | Load Regs. | Generate Mask | |
|---|---|---|---|
| R0 | 2 2 2 9 2 9 2 2 | 0 0 0 1 0 1 0 0 | |
| R1 | 3 3 3 3 3 3 3 3 | 3 3 3 3 3 3 3 3 | |
| R2 | 2 2 2 9 2 9 2 2 | 2 2 2 9 2 9 2 2 | |
| R3 | | | |
| R4 | 5 5 5 9 5 9 5 5 | 0 0 0 1 0 1 0 0 | |
| R5 | 6 9 6 6 9 6 6 6 | 6 9 6 6 9 6 6 6 | |
| R6 | 5 5 5 9 5 9 5 5 | 5 5 5 9 5 9 5 5 | |
| R7 | | | |

| | Apply Mask to R2 | Apply Mask to R1 | Combine |
|---|---|---|---|
| R0 | 0 0 0 1 0 1 0 0 | 0 0 0 1 0 1 0 0 | 3 3 3 9 3 9 3 3 |
| R1 | 3 3 3 3 3 3 3 3 | 3 3 3 0 3 0 3 3 | 3 3 3 0 3 0 3 3 |
| R2 | 0 0 0 9 0 9 0 0 | 0 0 0 9 0 9 0 0 | 0 0 0 9 0 9 0 0 |
| R3 | | | |
| R4 | 0 0 0 1 0 1 0 0 | 0 0 0 1 0 1 0 0 | 6 9 6 9 9 9 6 6 |
| R5 | 6 9 6 6 9 6 6 6 | 6 9 6 0 9 0 6 6 | 6 9 6 0 9 0 6 6 |
| R6 | 0 0 0 9 0 9 0 0 | 0 0 0 9 0 9 0 0 | 0 0 0 9 0 9 0 0 |
| R7 | | | |

| | Load Regs. | Generate Mask | |
|---|---|---|---|
| R0 | 3 3 3 9 3 9 3 3 | 1 0 0 1 0 1 0 0 | |
| R1 | 0 3 3 3 9 3 9 3 | 0 3 3 3 9 3 9 3 | |
| R2 | 3 3 3 9 3 9 3 3 | 3 3 3 9 3 9 3 3 | |
| R3 | 3 3 3 9 3 9 3 3 | 3 3 3 9 3 9 3 3 | |
| R4 | 6 9 6 9 9 9 6 6 | 1 1 0 1 0 0 0 0 | |
| R5 | 0 6 9 6 9 9 9 6 | 0 6 9 6 9 9 9 6 | |
| R6 | 6 9 6 9 9 9 6 6 | 6 9 6 9 9 9 6 6 | |
| R7 | 6 9 6 9 9 9 6 6 | 6 9 6 9 9 9 6 6 | |

| | Apply Mask to R2 | Apply Mask to R1 | Combine |
|---|---|---|---|
| R0 | 1 0 0 1 0 1 0 0 | 1 0 0 1 0 1 0 0 | 3 3 3 9 9 9 9 3 |
| R1 | 0 3 3 3 9 3 9 3 | 0 3 3 0 9 0 9 3 | 0 3 3 0 9 0 9 3 |
| R2 | 3 0 0 9 0 9 0 0 | 3 0 0 9 0 9 0 0 | 3 0 0 9 0 9 0 0 |
| R3 | 3 3 3 9 3 9 3 3 | 3 3 3 9 3 9 3 3 | 3 3 3 9 3 9 3 3 |
| R4 | 1 1 0 1 0 0 0 0 | 1 1 0 1 0 0 0 0 | 6 9 9 9 9 9 9 6 |
| R5 | 0 6 9 6 9 9 9 6 | 0 0 9 0 9 9 9 6 | 0 0 9 0 9 9 9 6 |
| R6 | 6 9 0 9 0 0 0 0 | 6 9 0 9 0 0 0 0 | 6 9 0 9 0 0 0 0 |
| R7 | 6 9 6 9 9 9 6 6 | 6 9 6 9 9 9 6 6 | 6 9 6 9 9 9 6 6 |

| | Load Regs. | Generate Mask | |
|---|---|---|---|
| R0 | 3 3 3 9 9 9 9 3 | 1 1 0 1 1 0 1 0 | |
| R1 | 0 0 3 3 3 9 3 9 | 0 0 3 3 3 9 3 9 | |
| R2 | 3 3 3 9 9 9 9 3 | 3 3 3 9 9 9 9 3 | |
| R3 | 3 3 3 9 3 9 3 3 | 3 3 3 9 3 9 3 3 | |
| R4 | 6 9 9 9 9 9 9 6 | 1 1 1 0 1 0 0 0 | |
| R5 | 0 0 6 9 6 9 9 9 | 0 0 6 9 6 9 9 9 | |
| R6 | 6 9 9 9 9 9 9 6 | 6 9 9 9 9 9 9 6 | |
| R7 | 6 9 6 9 9 9 6 6 | 6 9 6 9 9 9 6 6 | |

| | Apply Mask to R2 | Apply Mask to R1 | Combine |
|---|---|---|---|
| R0 | 1 1 0 1 1 0 1 0 | 1 1 0 1 1 0 1 0 | 3 3 3 9 9 9 9 9 |
| R1 | 0 0 3 3 3 9 3 9 | 0 0 3 0 0 9 0 9 | 0 0 3 0 0 9 0 9 |
| R2 | 3 3 0 9 9 0 9 0 | 3 3 0 9 9 0 9 0 | 3 3 0 9 9 0 9 0 |
| R3 | 3 3 3 9 3 9 3 3 | 3 3 3 9 3 9 3 3 | 3 3 3 9 3 9 3 3 |
| R4 | 1 1 1 0 1 0 0 0 | 1 1 1 0 1 0 0 0 | 6 9 9 9 9 9 9 9 |
| R5 | 0 0 6 9 6 9 9 9 | 0 0 0 9 0 9 9 9 | 0 0 0 9 0 9 9 9 |
| R6 | 6 9 9 0 9 0 0 0 | 6 9 9 0 9 0 0 0 | 6 9 9 0 9 0 0 0 |
| R7 | 6 9 6 9 9 9 6 6 | 6 9 6 9 9 9 6 6 | 6 9 6 9 9 9 6 6 |

| | Apply Mask to R2 | Apply Mask to R1 | Combine |
|---|---|---|---|
| R0 | 1 1 0 1 1 0 1 0 | 1 1 0 1 1 0 1 0 | 3 3 3 9 9 9 9 9 |
| R1 | 0 0 3 3 3 9 3 9 | 0 0 3 0 0 9 0 9 | 0 0 3 0 0 9 0 9 |
| R2 | 3 3 0 9 9 0 9 0 | 3 3 0 9 9 0 9 0 | 3 3 0 9 9 0 9 0 |
| R3 | 3 3 3 9 3 9 3 3 | 3 3 3 9 3 9 3 3 | 3 3 3 9 3 9 3 3 |
| R4 | 1 1 1 0 1 0 0 0 | 1 1 1 0 1 0 0 0 | 6 9 9 9 9 9 9 9 |
| R5 | 0 0 6 9 6 9 9 9 | 0 0 0 9 0 9 9 9 | 0 0 0 9 0 9 9 9 |
| R6 | 6 9 9 0 9 0 0 0 | 6 9 9 0 9 0 0 0 | 6 9 9 0 9 0 0 0 |
| R7 | 6 9 6 9 9 9 6 6 | 6 9 6 9 9 9 6 6 | 6 9 6 9 9 9 6 6 |

| | left shift R0 | right shift R0 |
|---|---|---|
| R0 | 3 9 9 9 9 9 0 0 | 0 3 9 9 9 9 9 0 |
| R1 | 0 0 3 0 0 9 0 9 | 0 0 3 0 0 9 0 9 |
| R2 | 3 3 0 9 9 0 9 0 | 3 3 0 9 9 0 9 0 |
| R3 | 3 3 3 9 3 9 3 3 | 3 3 3 9 3 9 3 3 |
| R4 | 9 9 9 9 9 9 0 0 | 0 9 9 9 9 9 9 0 |
| R5 | 0 0 0 9 0 9 9 9 | 0 0 0 9 0 9 9 9 |
| R6 | 6 9 9 0 9 0 0 0 | 6 9 9 0 9 0 0 0 |
| R7 | 6 9 6 9 9 9 6 6 | 6 9 6 9 9 9 6 6 |

Once the neighborhood winners for rows 1–3 and 4–6 are determined, they are stored to the transformation image along with the previously determined neighborhood winners for rows 2–4 and 3–5, as indicated below. This completes determination of the neighborhood winners for those portions of rows 1–6 read into the cache in step 45. In order to complete transformation of the Source Image, the foregoing steps can be repeated for the remainder of the first six rows, as well as for the other rows in the image.

```
            0 3 9 9 9 9 9 0
            0 4 9 9 9 9 9 0
            0 5 9 9 9 9 9 0
            0 9 9 9 9 9 9 0
          Transformation Image
```

Figure 4:
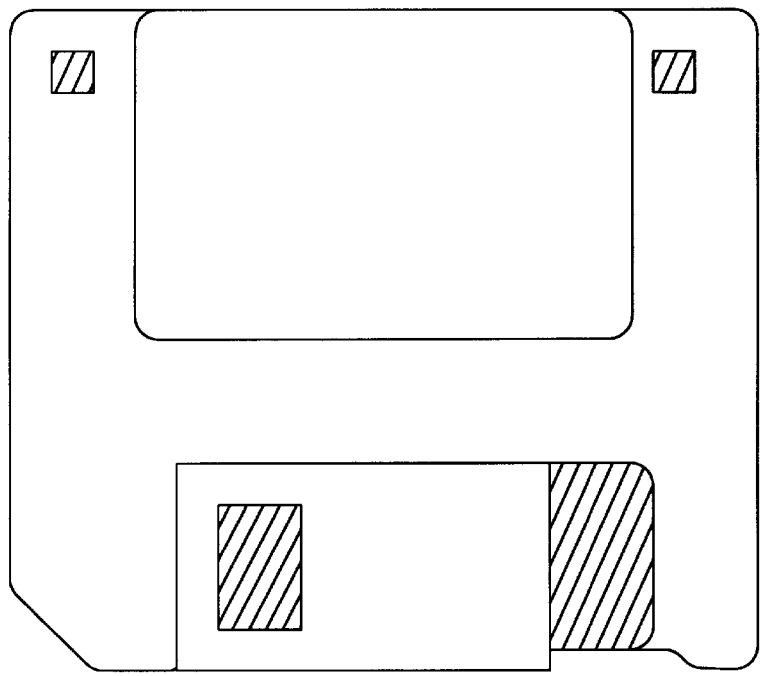
FIG. 4 depicts a computer readable medium containing programming instructions for configuring a digital data processor to practice the invention.
Figure 4:
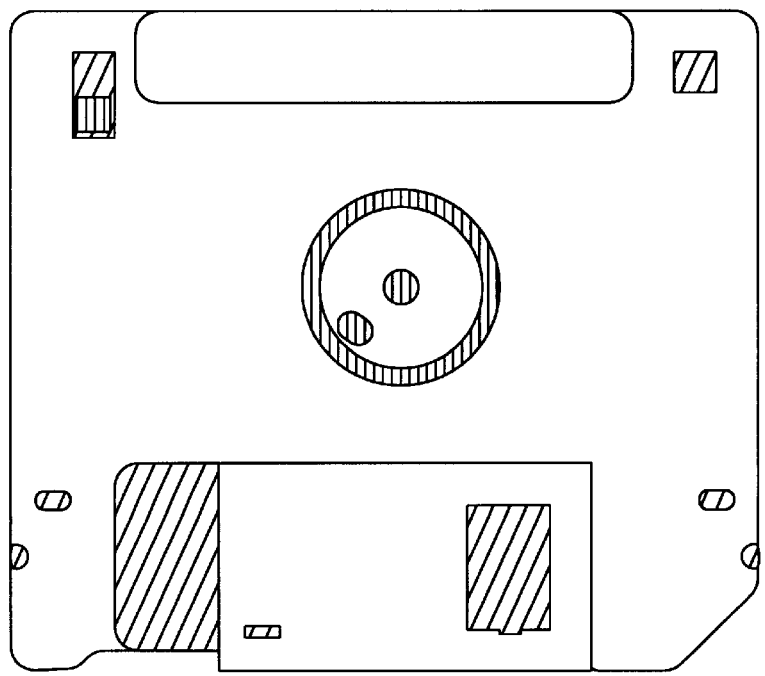

FIG. 4 depicts an article of manufacture, to wit, a magnetic diskette, composed of a computer usable media, to wit, a magnetic disk, embodying a computer program that causes device 20, or other such digital data processing apparatus, to operate in accord with the methods described above in connection with FIGS. 1–5. The diskette is shown in front view and back view. It is of conventional construction and has the computer program stored on the magnetic media therein in a conventional manner readable, e.g., via a read/write head contained in a diskette drive of apparatus 30. It will be appreciated that diskette is shown by way of example only and that other articles of manufacture comprising computer usable media on which programs intended to cause a computer to execute in accord with the teachings hereof are also embraced by the invention.

Described above are systems and methods meeting the objects set forth herein. As noted earlier, these systems and methods require only a limited number of registers in order to generate morphological transformations. As a result, they permit higher pixel throughput and, consequently, speed processing of images. They also allow processing of larger images. Moreover, the systems and methods organize data flow in a manner that minimizes memory access penalties, specifically, through better utilization of data residing in cache. This minimizes memory faults and also, therefore, speeds image processing.

Those skilled in the art will appreciate that the specific embodiments illustrated in the drawings and described above are illustrative only, and that other embodiments incorporating modifications thereto fall within the scope of the invention. Thus, for example, it will be appreciated that the invention is not limited to practice with square neighborhoods, much less 3×3 neighborhoods of the types shown above. Moreover, it will be appreciated that the invention can be applied to use of morphological transformation other than erosion and dilation operations, e.g., via selection of pixels of selected ranks other than minimum and maximum. Still further, for example, it will be appreciated that the methods and apparatus described above need not be implemented in software but, rather, can be implemented in hardware as well. Yet still further, it will be appreciated that the invention can be utilized for applying uniform, as well as non-uniform offsets.

In view of the foregoing, what I claim is:

1. A machine vision method for morphological transformation of a source image, the method comprising the steps of
  A. for each of selected columns of pixels in the source image, determining and retaining a value of selected rank as between an intensity of a pixel in that column in a first row of that image and intensities of pixels in that column in one or more neighboring rows of that image, so as to determine a "column winner" for each selected column,
  B. for each of the selected columns in the source image, determining a value of selected rank as between the column winner determined in step (A) for that column and the column winners retained in step (A) for one or more columns-neighboring that column,
  C. retaining in a transformation image at least selected values of selected rank determined in step (B).

2. A method according to claim 1, adapted for dilation of the source image, where the selected rank in steps (A) and (B) is a maximum.

3. A method according to claim 1, adapted for erosion of the source image, where the selected rank in steps (A) and (B) is a minimum.

4. A method according to claim 1, wherein step (A) comprises
  (i) loading the selected columns of pixels of the first row of the source image into corresponding columns in a first data store,
  (ii) loading the selected columns of pixels of a second row of pixels of the source image into corresponding columns in a second data store,
  (iii) for each of the selected columns, determining a value of selected rank by comparing with one another intensities of pixels in that column in the first and second data stores, and loading the value of selected rank back into that column of the first data store.

5. A method according to claim 4, wherein step (A) further comprises
  (i) loading the selected columns of pixels of each of one or more additional rows of the source image into corresponding columns in the second data store,
  (ii) for each of the selected columns, determining a value of selected rank by comparing with one another intensities of pixels in that column in the first and second data stores, and loading the value of selected rank back into that column of the first data store.

6. A method according to claim 5, wherein step (B) comprises, for each of the selected columns, determining the value of selected rank by comparing the value loaded into that column of the first data store in step 5(ii) with the values loaded into adjacent columns of that data store in that same step.

7. A method according to claim 1, comprising the step of adding an offset to a value of selected rank prior to retaining it in step (C).

8. A method according to any of claims 1 and 4, comprising the step of executing steps (A)–(C) to determine and retain in the transformed image values of selected rank for the selected columns of a first set of rows in the source image, while substantially concurrently executing steps (A)–(C) to determine and retain in the transformed image values of selected rank for those columns of a second set of rows in the source image, wherein the first and second sets may include one or more rows in common.

9. A method according to claim 8, adapted for morphological transformation of a source image having at least six rows of pixels, where the transformation uses a neighborhood having a height of 3 rows, the method comprising the steps of
  (i) executing steps (A)–(C) to retain in the transformed image values of selected rank from the selected columns of second, third and fourth rows of the source image, while substantially concurrently executing steps (A)–(C) to retain in the transformed image values of selected rank from the selected columns of third, fourth, and fifth rows of the source image,
  (ii) executing steps (A)–(C) to retain in the transformed image values of selected rank from the selected columns of first, second, and third rows of the source image, while substantially concurrently executing steps (A)–(C) to retain in the transformed image values of selected rank from the selected columns of fourth, fifth and sixth rows of the source image.

10. An article of manufacture comprising a computer usable medium embodying program code for causing a digital data processor to carry out a method for morphological transformation of a source image, the method comprising the steps of
  A. for each of selected columns of pixels in the source image, determining and retaining a value of selected rank as between an intensity of a pixel in that column in a first row of that image and intensities of pixels in that column in one or more neighboring rows of that image, so as to determine a "column winner" for each selected column,
  B. for each of the selected columns in the source image, determining a value of selected rank as between the column winner determined in step (A) for that column and the column winners retained in step (A) for one or more columns neighboring that column,
  C. retaining in a transformation image at least selected values of selected rank determined in step (B).

11. An article according to claim 10, wherein the method is adapted for dilation of the source image, where the selected rank is a maximum.

12. An article according to claim 10, wherein the method is adapted for erosion of the source image, where the selected rank is a minimum.

13. An article according to claim 10, wherein step (A) comprises
  (i) loading the selected columns of pixels of the first row of the source image into corresponding columns in a first data store,
  (ii) loading the selected columns of pixels of a second row of pixels of the source image into corresponding columns in a second data store,
  (iii) for each of the selected columns, determining a value of selected rank by comparing with one another intensities of pixels in that column in the first and second data stores, and loading the value of selected rank back into that column of the first data store.

14. An article according to claim 10, wherein the method comprises the step of adding an offset to a value of selected rank prior to retaining it in step (C).

15. An article according to claim 10, wherein the method comprises the step of executing steps (A)–(C) to determine and retain in the transformed image values of selected rank for respective ones of at least selected columns of a first set of rows in the source image, while substantially concurrently executing steps (A)–(C) to determine and retain in the transformed image values of selected rank for those columns of a second set of rows in the source image, wherein the first and second sets may include one or more rows in common.

16. A digital data processing system carrying out a method for morphological transformation of a source image, the method comprising the steps of A. for each of selected columns of pixels in the source image, determining and retaining a value of selected rank as between an intensity of a pixel in that column in a first row of that image and intensities of pixels in that column in one or more neighboring rows of that image, so as to determine a "column winner" for each selected column, B. for each of the selected columns in the source image, determining a value of selected rank as between the column winner determined in step (A) for that column and the column winners retained in step (A) for one or more columns neighboring that column, C. retaining in a transformation image at least selected values of selected rank determined in step (B).

17. A digital data processing system according to claim 16, adapted for dilation of the source image, where the selected rank in steps (A) and (B) is a maximum.

18. A digital data processing system according to claim 16, adapted for erosion of the source image, where the selected rank in steps (A) and (B) is a minimum.

19. A digital data processing system according to claim 16, wherein step (A) comprises (i) loading the selected columns of pixels of the first row of the source image into corresponding columns in a first data store, (ii) loading the selected columns of pixels of a second row of pixels of the source image into corresponding columns in a second data store, (iii) for each of the selected columns, determining a value of selected rank by comparing an intensity of a pixel in that column in the first data store with an intensity of a pixel in that column in the second data store, and loading the value of selected rank back into that column of the first data store.

20. A digital data processing system according to claim 19, wherein step (A) further comprises (i) loading at least selected columns of pixels of one or more additional rows of the source image into corresponding columns in the second data store, (ii) for each of the selected columns, determining a value of selected rank by comparing an intensity of a pixel in that column in the first data store with an intensity of a pixel in that column in the second data store, and loading the value of selected rank back into that column of the first data store.

21. A digital data processing system according to claim 20, wherein step (B) comprises, for each of the selected columns, determining the value of selected rank by comparing the value loaded into that column of the first data store in step 5(ii) with the values loaded into adjacent columns of that data store in that same step.

22. A digital data processing system according to claim 16, comprising the step of adding an offset to a value of selected rank prior to retaining it in step (C).

23. A digital data processing system according to any of claims 16 and 19, comprising the step of executing steps (A)–(C) to determine and retain in the transformed image values of selected rank for the selected columns of a first set of rows in the source image, while substantially concurrently executing steps (A)–(C) to determine and retain in the transformed image values of selected rank for those columns of a second set of rows in the source image, wherein the first and second sets may include one or more rows in common.

24. A digital data processing system according to claim 8, adapted for morphological transformation of a source image having at least six rows of pixels, where the transformation uses a neighborhood having a height of 3 rows, the method comprising the steps of (i) executing steps (A)–(C) to retain in the transformed image values of selected rank from the selected columns of second, third and fourth rows of the source image, while substantially concurrently executing steps (A)–(C) to retain in the transformed image values of selected rank from the selected columns of third, fourth, and fifth rows of the source image, (ii) executing steps (A)–(C) to retain in the transformed image values of selected rank from the selected columns of first, second, and third rows of the source image, while substantially concurrently executing steps (A)–(C) to retain in the transformed image values of selected rank from the selected columns of fourth, fifth and sixth rows of the source image.

* * * * *